J. EHNE.
LAWN EDGE TRIMMER.
APPLICATION FILED JAN. 5, 1921.

1,374,641. Patented Apr. 12, 1921.

WITNESSES

INVENTOR
John Ehne
ATTORNEY

UNITED STATES PATENT OFFICE.

JOHN EHNE, OF MILWAUKEE, WISCONSIN, ASSIGNOR TO ARTHUR J. EHNE, OF MILWAUKEE, WISCONSIN.

LAWN-EDGE TRIMMER.

1,374,641.            Specification of Letters Patent.      Patented Apr. 12, 1921.

Application filed January 5, 1921. Serial No. 435,178.

*To all whom it may concern:*

Be it known that I, JOHN EHNE, a citizen of the United States, and resident of Milwaukee, in the county of Milwaukee and State of Wisconsin, have invented new and useful Improvements in Lawn-Edge Trimmers, of which the following is a description, reference being had to the accompanying drawings, which are a part of this specification.

This invention has for its object to provide a means for quickly and easily trimming the edge of a lawn near a walk or the like to remove the surplus growth of sod and produce a clean cut valley or gutter between the lawn and the walk.

With the above object in view the invention comprise a cutter of such a construction and shape that it may be pushed or drawn along the edge of the walk with a guide bearing against the walk and having an inclined knife edge merging with a laterally extending undercut knife edge, the former to slice the edge of the lawn and the latter to cut it from the soil beneath and turn it out of the furrow.

With the above and other objects in view the invention consists in the lawn edge trimmer herein claimed, and all equivalents.

Referring to the accompanying drawings in which like characters of reference indicate the same parts in the different views.

Figure 1:
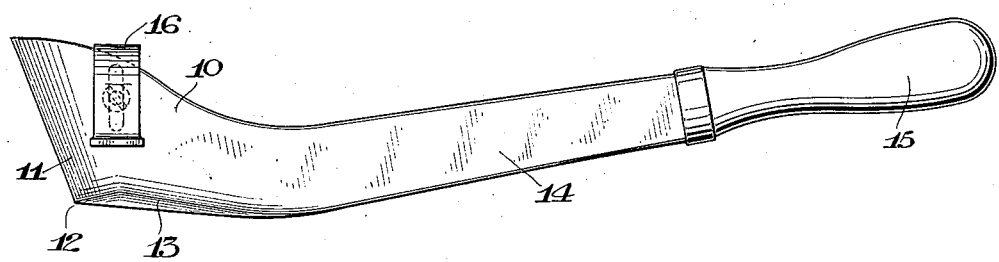
Figure 1 is a side elevation of a lawn edge trimmer constructed in accordance with this invention.
Figure 2:
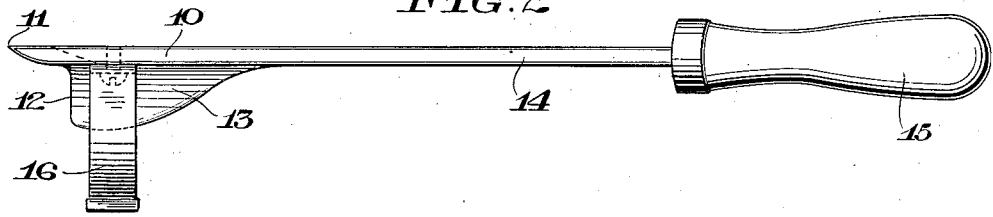
Fig. 2 is a plan view thereof.
Figure 3:
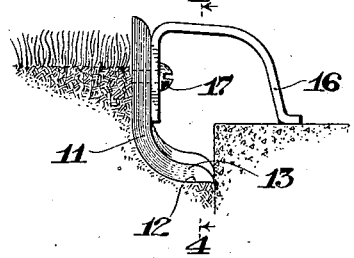
Fig. 3 is an end elevation looking toward the cutting edges.
Figure 4:
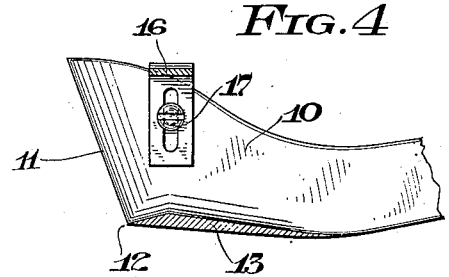
Fig. 4 is a detail sectional view on the dotted line of Fig. 3.
Figure 5:
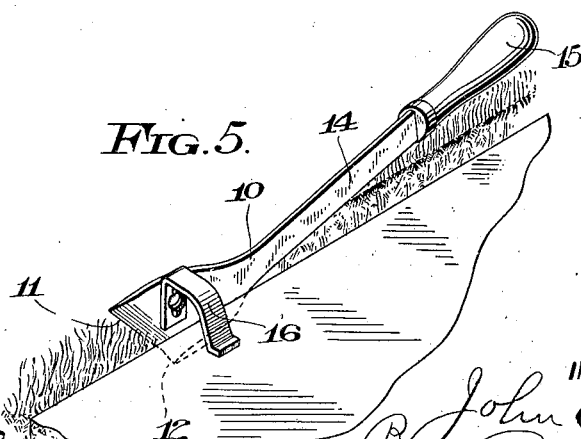
Fig. 5 is a perspective view showing the invention in use.

In these drawings 10 indicates the head of the tool which is of an angular shape in cross section with the front edge of its vertical portion beveled to form an inclined knife edge 11 merging with a horizontal undercut knife edge 12 of the curved laterally extending under portion 13. A shank 14 extends rearwardly and upwardly from the head 10 and has a handle 15 mounted thereon which may be a short handle as shown or a long handle to permit of the use of the implement while the operator is in a standing position.

In order to control the depth of the cut an arched gage strip 16 is adjustably secured to the inner face of the vertical portion of the head 10 by means of a clamping screw 17 fitting in a slot of the gage strip and threaded to the head 10, the outer end of said gage strip serving to bear on the walk as the tool is moved along the edge thereof. By adjusting the gage strip to a higher or lower position on the tool the cut made by the knife edges will be varied in depth accordingly.

In use, the implement is moved along the edge of the lawn by either a pushing or a pulling motion, according to the direction of the handle, the side extension 13 bearing against the edge of the walk to guide the inclined slicing edge 11 in its movements and cause it to produce a cut in the sod at a uniform distance from the edge of the walk. The inclination of the slicing edge 11 causes it to make a clean unbroken cut without tearing the edge of the sod. After the slicing edge 11 cuts the edge of the sod in a vertical plane the horizontal cutting edge 12 severs it from the soil beneath and the inclination of the projection 13 serves as a share for turning the severed edge of the sod out of the furrow. The result of the action of the tool is to leave a clean-cut gutter or valley of the desired width and depth between the lawn and the walk which produces a neat appearance and prevents the spreading of the lawn over the edges of the walk.

The side extension 13 has its cutting edge extending to its side edge where it bears against the edge of the side walk so that the cutting edge may cut the sod clear up to the edge of the side walk even though there may be a rough edge to the side walk which would interfere with the action of a vertical blade. The result of this construction is that the gutter or valley produced by the implement is clean cut and without a fringe of grass at the very edge of the side walk required to be trimmed by other means.

What I claim as new and desire to secure by Letters Patent is:

A lawn edge trimmer, comprising a cutter having a substantially vertical blade with a forwardly inclined cutting blade with a laterally extending lower edge terminating in a bearing edge, such laterally extending portion forming a cutting edge in continuation of the cutting edge of the vertical blade portion, said bearing edge being adapted to bear against the edge of a cement sidewalk below the surface of the ground, an arched guide extending from the blade and adapted to bear on the sidewalk, the continuous cutting edge of the cutter thus extending from above the sod to the extreme lower part of the cutter at an incline that will tend to lift the trimmer from the ground and continuing along the laterally extending portion and terminating at the bearing edge where the cutter engages the sidewalk below the surface of the ground, and a handle on the cutter for pushing it forwardly and pressing it downwardly.

In testimony whereof, I affix my signature.

JOHN EHNE.